E. E. BROWN.
SEED CORN HANGER OR DRYING RACK.
APPLICATION FILED AUG. 15, 1913.
1,142,484.
Patented June 8, 1915.
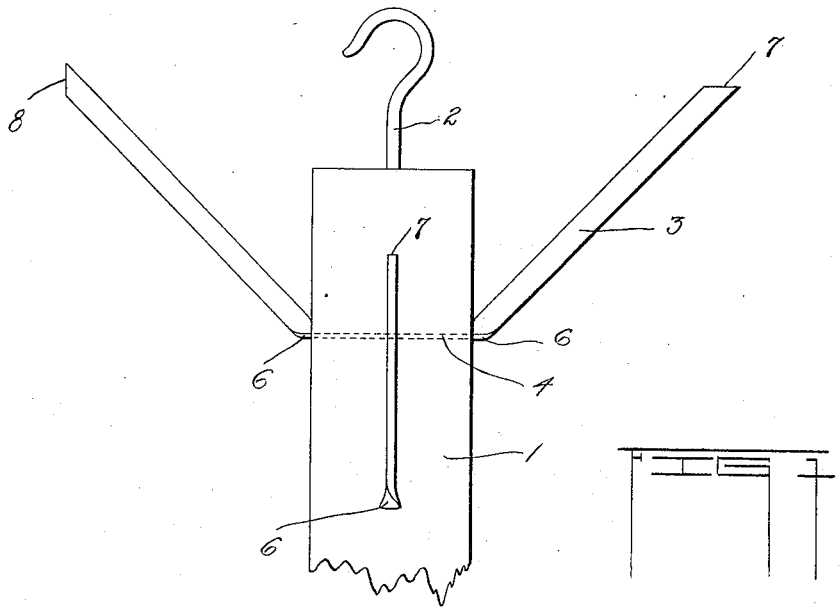

UNITED STATES PATENT OFFICE.

EDMUND E. BROWN, OF PERSIA, IOWA.

SEED-CORN HANGER OR DRYING-RACK.

1,142,484.   Specification of Letters Patent.   Patented June 8, 1915.

Application filed August 15, 1913. Serial No. 784,891.

*To all whom it may concern:*

Be it known that I, EDMUND E. BROWN, a citizen of the United States, residing at Persia, in the county of Harrison and State of Iowa, have invented certain new and useful Improvements in Seed-Corn Hangers or Drying-Racks, of which the following is a specification.

This invention has reference to seed corn hangers or drying racks, and has for its object to provide a device of this character, simple in construction, cheap to manufacture, durable and very effective for the purposes for which it is intended.

The invention has particular reference to that class of devices which are employed for sustaining ears of corn in such position that each is separate from or not touching the other, and each ear fully exposed to the air, whereby the corn may be dried out in the best possible manner.

That the invention may be more fully understood, reference is had to the accompanying drawings, in which:

Figure 1 is an elevation of only a portion of the device showing the support for the ear-sustaining means, and the ear-sustaining means attached thereto or associated therewith, and Fig. 2 is a cross-section, in plan, of the device showing how the ear-sustaining means is carried therethrough.

Like characters of reference denote corresponding parts throughout the figures.

1, designates, what may be termed the support, being in reality the hanger proper, and preferably made of wood of any suitable length and square in cross-section, the thickness of the hanger being of a size best suited for the purposes, for which the device is intended. The support or hanger, at one end, is provided with a hook 2, or equivalent member for hanging the support, or to enable the same to be suspended in convenient places.

3, designates one of, the ear-sustaining means, or support prongs for the ears of corn. Each one is preferably made of a flat bar of suitable length and thickness. They are driven or forced through the support or hanger 1, at spaced points, as at 4, and alternately in directions at right angles to each other, so that the ear-sustaining means or prongs are in staggered arrangement on said support.

In producing the ear-sustaining means or prongs 3, which as stated, are made from flat-bars, preferably of steel, each pair of prongs being in an integral part is cut from a continuous or single length of bar so as to produce the sharp points 7 and 8 which facilitate the operation of impaling the butt end of an ear of corn thereon, as they will readily enter the pit. The sharp edge or point 7 on a prong 3 of one of the sustaining means, is cut from that end of an adjoining bar producing the sharp edge or point 8. In driving or forcing the ear-sustaining bar 3 through the support or hanger 1, the bar 3 is held with its flat face uppermost, presenting the flat or retaining portion 5 in the hanger, and at the point where the bar 3 leaves the hanger, on each side, to form the ear-sustaining means or prongs, the bar is twisted, as at 6, by giving it a turn of substantially 90° and then bent upwardly and inwardly. Twisting the bars at points 6, adjacent the sides of the hanger, not only serves to properly position the sides and edges of the prongs for the easy impaling of the ears of corn thereon, but also stiffens the prongs in their ear-sustaining positions.

While I prefer to force the flat bars 3 through the support on hanger 1, insuring the bars against turning therein, openings might be provided in the hanger or support through which the bars would be inserted, relying on the twists 6 to hold the bars in proper position, this is not considered entirely practical from a manufacturing view point.

When shipping the device, the prongs 3 may be bent up against the sides of the hanger or support 1, to lie thereagainst, and when unpacked, said prongs, may be moved to the ear-sustaining positions shown in Fig. 1.

What I claim is:—

1. In a device of the character described, in combination, a hanger of wood, and ear-corn-sustaining means for said hanger, said sustaining means comprising a flat-steel-bar forced through said hanger and twisted adjacent the opposite faces thereof from which points the opposite ends of the bar diverge upwardly.

2. In a device of the character described, in combination, a hanger of wood, means attached to the upper end of the hanger for supporting the hanger, and ear-corn-sustaining means for said hanger, said sustaining means comprising a flat steel bar forced through said hanger with a flat face thereof upper-most in said hanger, and said bar adjacent the opposite faces of the hanger being twisted by a turn of substantially 90° from which points the opposite ends of the bar are bent upwardly.

3. In a device of the character described, in combination, a support, ear-corn-sustaining means for said support, comprising a flat-steel-bar, said bar being twisted at points 6 to stiffen the impaling portions of said bars, the ends of said impaling portions of the bar being pointed.

4. Ear-corn-sustaining means for a corn hanger, comprising the bar 3 cut from a length of steel bar in a manner so as to produce the opposite angular impaling edges 7 and 8, said bar being twisted approximately 90° at points 6, producing the central flat and securing portion 5.

In testimony whereof I affix my signature, in presence of two witnesses.

EDMUND E. BROWN.

Witnesses:
J. G. Cave,
A. C. Peterson.

Copies of this patent may be obtained for five cents each, by addressing the "Commissioner of Patents, Washington, D. C."